(12) United States Patent
Barak (10) Patent No.: US 10,360,381 B2
(45) Date of Patent: Jul. 23, 2019

(54) DETECTION OF PERSISTENT THREATS IN A COMPUTERIZED ENVIRONMENT BACKGROUND

(71) Applicant: Palo Alto Networks, Inc., Santa Clara, CA (US)

(72) Inventor: Gil Barak, Raanana (IL)

(73) Assignee: Palo Alto Networks, Inc., Santa Clara, CA (US)

(*) Notice: Subject to any disclaimer, the term of this patent is extended or adjusted under 35 U.S.C. 154(b) by 249 days.

(21) Appl. No.: 15/404,545

(22) Filed: Jan. 12, 2017

(65) Prior Publication Data

US 2017/0206358 A1    Jul. 20, 2017

Related U.S. Application Data

(60) Provisional application No. 62/278,443, filed on Jan. 14, 2016.

(51) Int. Cl.
*G06F 21/00* (2013.01)
*G06F 21/56* (2013.01)

(52) U.S. Cl.
CPC ............... *G06F 21/566* (2013.01)

(58) Field of Classification Search
CPC ...................................... G06F 21/566
USPC ............................................. 726/23
See application file for complete search history.

(56) References Cited

U.S. PATENT DOCUMENTS

| 7,398,532 B1 | 7/2008 | Barber et al. |
| 8,453,244 B2 | 5/2013 | Dai et al. |
| 2016/0357958 A1* | 12/2016 | Guidry ............... G06F 21/53 |

* cited by examiner

*Primary Examiner* — Longbit Chai
(74) *Attorney, Agent, or Firm* — Gilliam IP PLLC (57) ABSTRACT

A system is used for detection of advanced persistent and non-persistent threats in a computerized environment. The system collects data about at least a first event associated with a process of an operating system of one of a plurality of devices connected to a network. The system identifies threads which attribute to the first event. The system generates a causality chain for the first event, where the causality chain comprises the threads which attribute to the first event in chronological order of spawning. The system determines whether a main thread corresponding to the first process can be identified based, at least in part, on the causality chain. Based on determining that the main thread corresponding to the first process cannot be identified, the system determines that the process is malicious.

21 Claims, 5 Drawing Sheets

DETECTION OF PERSISTENT THREATS IN A COMPUTERIZED ENVIRONMENT BACKGROUND

CROSS-REFERENCE TO RELATED APPLICATIONS

This Application claims the benefit of U.S. Provisional Application Ser. No. 62/278,443 filed Jan. 14, 2016, the entire contents of which are incorporated herein by reference in their entirety.

BACKGROUND

1. Field

The present disclosure generally relates to data security, and more specifically, to a system and methods for detecting advanced persistent threats in a computerized environment.

2. Description of Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

As organizations and enterprises get bigger, they are more and more exposed to malicious attacks. Kaspersky® reports detections of over 300,000 different malware variants in a single day. The United Kingdom government reports over 100,000 cyber-attacks on British companies every day.

In order to identify such attacks, a number of different anti-virus applications are currently available. Such anti-virus applications force security teams of large enterprises to manage thousands of new alerts every day, when responding to a single alert may take days, weeks and sometimes months.

These applications must be deployed into a computerized environment and attempt to identify malicious activity within the network. Other solutions may also be known. For example, anti-virus solutions that detect and remove known viruses by identifying "signatures" of such viruses may be available. The majority of these solutions rely upon a basic engine that searches suspect files for the presence of predetermined virus signatures. However, these related art solutions for identifying security incidents are not effective enough and malicious activity may go undetected.

In the view of the shortcoming of related art, it would be advantageous to provide an efficient solution for detecting security incidents in a computerized environment, detecting advanced persistent threats therein, and alerting upon detection of such threats.

SUMMARY

Exemplary implementation of the disclosed teachings overcome the above disadvantages and other disadvantages not described above. Also, an exemplary implementation of the disclosed teachings is not required to overcome the disadvantages described above, and an exemplary implementation of the disclosed teachings of the present inventive concept may not overcome any of the problems described above.

In some exemplary implementation of the disclosed teachings, a computerized method for detecting advanced persistent and non-persistent threats in a computer of a computerized environment associated with the computer, includes receiving electronic notification of events in the operating system of the computer, analyzing the events, and generating a causality chain for the events respective of the analysis such that the causality chain comprises all the threads that attribute to the events in a chronological order. Additionally, the computerized method identifies a main thread of the causality chain and determines whether a malicious process is associated with the main thread.

In other exemplary implementation of the disclosed teachings, an apparatus for detection of advanced persistent and non-persistent threats in a computer of a computerized environment associated with the computer, comprises an interface to an enterprises' system, non-transitory memory configured to store instructions, and a processor configured to read the instructions and operate as instructed by the instructions. The instructions include mining instructions for identification of at least one event initiated in the enterprise's system, analyze instructions to analyze the at least one event, and generation instructions to generate a causality chain for the at least one event respective of the analysis such that the causality chain comprises all the threads that attribute to the at least one event in a chronological order. The instructions further include identification instructions to identify a main thread of the causality chain, and determination instructions to determine whether a malicious process is associated with the main thread.

In yet other exemplary implementation of the disclosed teachings, a non-transitory computer readable storage medium, implemented by at least one processor allows a computer to receive an electronic notification of events in the operating system of the computer, analyze the events, and generate a causality chain for the events respective of the analysis such that the causality chain comprises all the threads that attribute to the events in a chronological order. Additionally, the non-transitory computer readable storage medium allows a computer to identify a main thread of the causality chain, and determine whether a malicious process is associated with the main thread.

BRIEF DESCRIPTION OF THE DRAWINGS

The foregoing and other objects, features, and advantages of the disclosed teachings will be apparent from the following detailed description taken in conjunction with the accompanying drawings, in which.

DETAILED DESCRIPTION

Below, exemplary implementations of the teachings will be described in detail with reference to accompanying drawings so as to be easily realized by a person having ordinary knowledge in the art. The exemplary implementations may be embodied in various forms without being limited to the exemplary implementations set forth herein. Descriptions of well-known parts are omitted for clarity, and like reference numerals refer to like elements throughout.

It is important to note that the exemplary implementations disclosed by the present application are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

A system is used for detection of advanced persistent and non-persistent threats (APTs and ANTPs) in a computerized environment. The system is connected to a plurality of user devices coupled to an enterprise's network. The system receives via an interface an electronic notification of at least one event in the operating system of the computer. The system then analyzes the at least one event. The system then generates a causality chain for the at least one event respective of the analysis. The causality chain comprises all the threads that attributed to the at least one event in a chronological order. The system then identifies a main thread that started the causality chain that led to the at least one event. Then, the system determines whether the main thread is associated with malicious software. Upon determination that the main thread is associated with malicious software, the causality chain is marked as infected.

Figure 1:
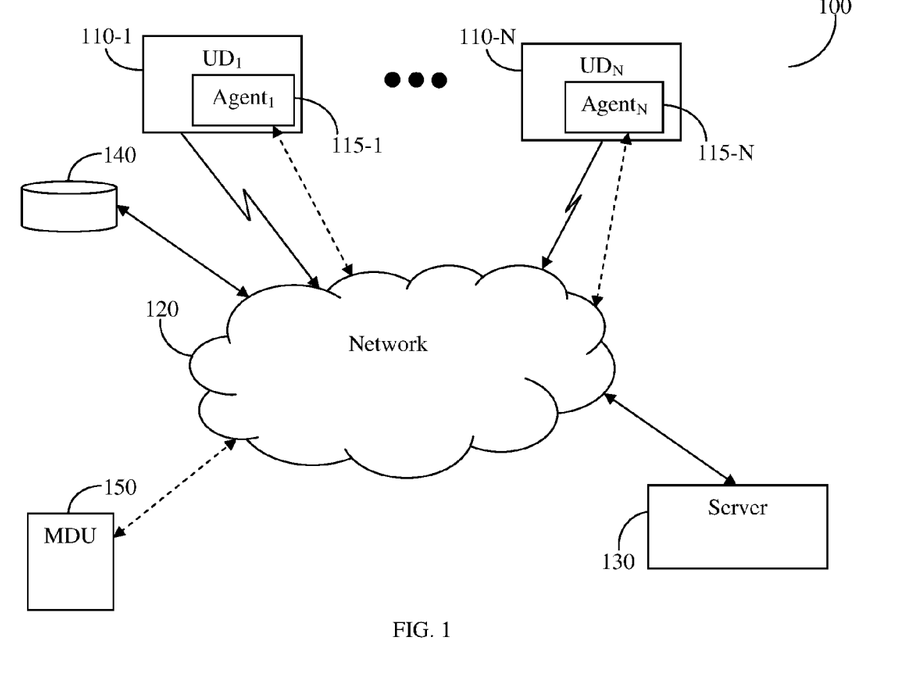
FIG. 1—is a block diagram of a network system used to describe the operation of the system according to an exemplary implementation of the disclosed teachings.

FIG. 1 depicts an exemplary and non-limiting block diagram used to describe the operation of the system 100 according to an exemplary implementation of the disclosed teachings. A plurality of user devices (UD) 110-1 through 110-N (collectively referred hereinafter as user devices 110 or individually as a user device 110, merely for simplicity purposes), where N is an integer equal to or greater than 1, are communicatively connected to an enterprise's network 120. The user devices 110 can be, but are not limited to smart phones, mobile phones, laptops, tablet computers, wearable computing devices, personal computers (PCs), a combination thereof and the like. The network 120 may comprise the likes of busses, local area network (LAN), wide area network (WAN), metro area network (MAN), the worldwide web (WWW), the Internet, as well as a variety of other communication networks, whether wired or wireless, and in any combination, that enable the transfer of data between the different elements of the system 100.

A server 130 is further connected to the network 120. The server 130 is configured to receive notifications and/or identify events occurring in the network 120 and continuously monitor the event and identify an attribution of each event. The server 130 is further configured to analyze the attributions and generate a causality chain associated therewith. In the network 120, an operating system associated therewith consist of hundreds of threads. These threads reside inside containers known as processes. Typically, when an operating system initializes, threads are spawned. Every thread is spawned using a Create Thread( )application programming interface (API). By monitoring all calls to Create Thread( ), the server 130 maps an entire threads connection map associated with each event. When a new process is spawned, it automatically spawns a new thread, which is the main thread of that process. An event may be of a new file request received from the UDs 110, a change in an existing file in the container, etc. A list of events may be predefined and stored in a database 140 communicatively coupled to the server 130 over the network 120.

According to an exemplary implementation of the disclosed teachings, the server 130 continuously monitors and collects data and/or metadata respective of all events which occurred in an operating system of a UD of the UDs 110, for example, the UD 110-1. According to another exemplary implementation of the disclosed teachings, the server 130 receives an electronic notification of at least one event which occurred in the operating system of at least one UD 110-1.

The server 130 is then configured to analyze the events which occurred. The analysis may include identification of all of that threads that led and/or attributed to the at least one event. The analysis may further include identification of an identification signature associated with each thread.

Respective of the analysis, the server 130 is configured to generate a causality chain for the at least one event. The causality chain comprises all the threads that attribute to the at least one event in a chronological order. The server 130 then uses the causality chain to identify a main thread that led to the event, i.e, the thread that started the process that ended at the at least one event. The server 130 then determines whether a malicious process is associated with the main thread. According to an exemplary implementation of the disclosed teachings, the determination whether a malicious process is associated with the main thread is achieved by querying a malware detection unit (MDU) 150 communicatively coupled to the server 130 over the network 120. According to further exemplary implementation of the disclosed teachings, if the determination indicates that a thread in the causality chain has no parent, i.e, no main thread associated thereto, the process is determined as malicious and marked as infected respective thereof. In case a determination was made that a malicious process is associated with the main thread, the process is marked by the server 130 as infected. According to further exemplary implementation of the disclosed teachings, upon determination that a malicious process is associated with the main thread, a determination is made by the server 130 of a root source which the malicious process is associated therewith. The root source may be, for example, one or more threads, one or more dynamic link libraries, a combination thereof, a portion thereof, etc.

Figure 2:
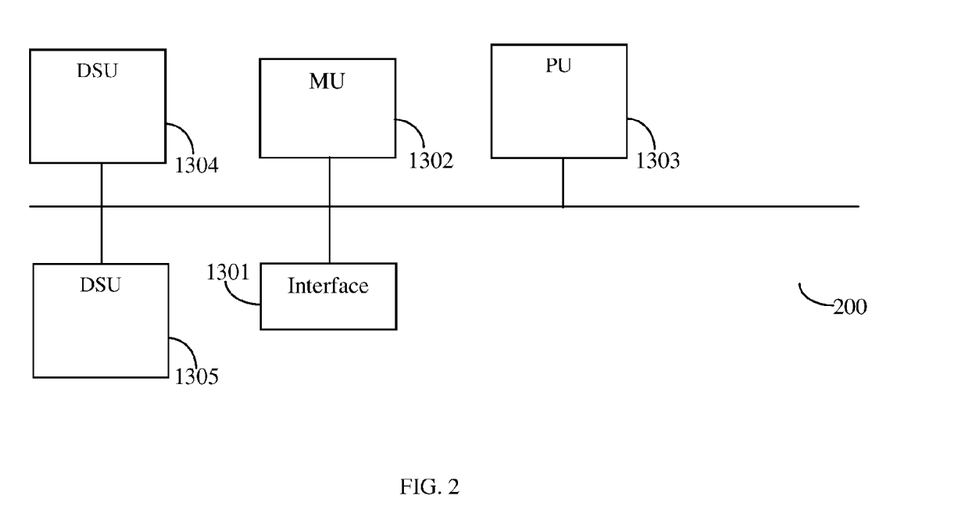
FIG. 2—is a schematic diagram of an apparatus used to describe the operation of the system according to an exemplary implementation of the disclosed teachings.

FIG. 2 is an exemplary and non-limiting schematic diagram 200 of the server 130 according to an exemplary implementation of the disclosed teachings. The server 130 includes an interface 1301 to the network 120 by which the server 130 sends and receives data associated with events occurred in an operating system of a user device, for example, the UD 110-1 over the network 120. Optionally, the server 130 further includes a mining unit (MU) 1302 by which the server 130 identifies one or more events that occurred in the operating system of the UD 110-1. The one or more events can then be analyzed by a processing unit (PU) 1303 to determine a type of each process. Optionally, the server 130 further includes a data storage unit (DSU) 1304 for storing the events that occurred and metadata associated thereto. The server 130 further comprises a malicious processes' detection unit (MDU) 1305. The MDU 1305 can be configured by the PU 1303 to determine whether a malicious process is associated with an event as further described hereinabove and below.

According to an exemplary implementation of the disclosed teachings, the MU 1302 continuously monitors and collects data and/or metadata respective of all events which occurred in an operating system of a UD 110-1. The PU 1303 then analyzes the events. Respective of the analysis, the PU 1303 is configured to generate a causality chain for the at least one event. The causality chain comprises all the threads that attribute to the at least one event in a chronological order. The PU 1303 then uses the causality chain to identify a main thread that led to the event, i.e, the thread that started the process that ended at the at least one event. The PU 1303 then configures the MDU 1305 to determine whether a malicious process is associated with the main thread. In case a determination was made that a malicious process is associated with the main thread, the process is marked by the PU 1303 as infected. Data respective of the process may then be sent for storage in the DSU 1304 for further processing.

Figure 3:
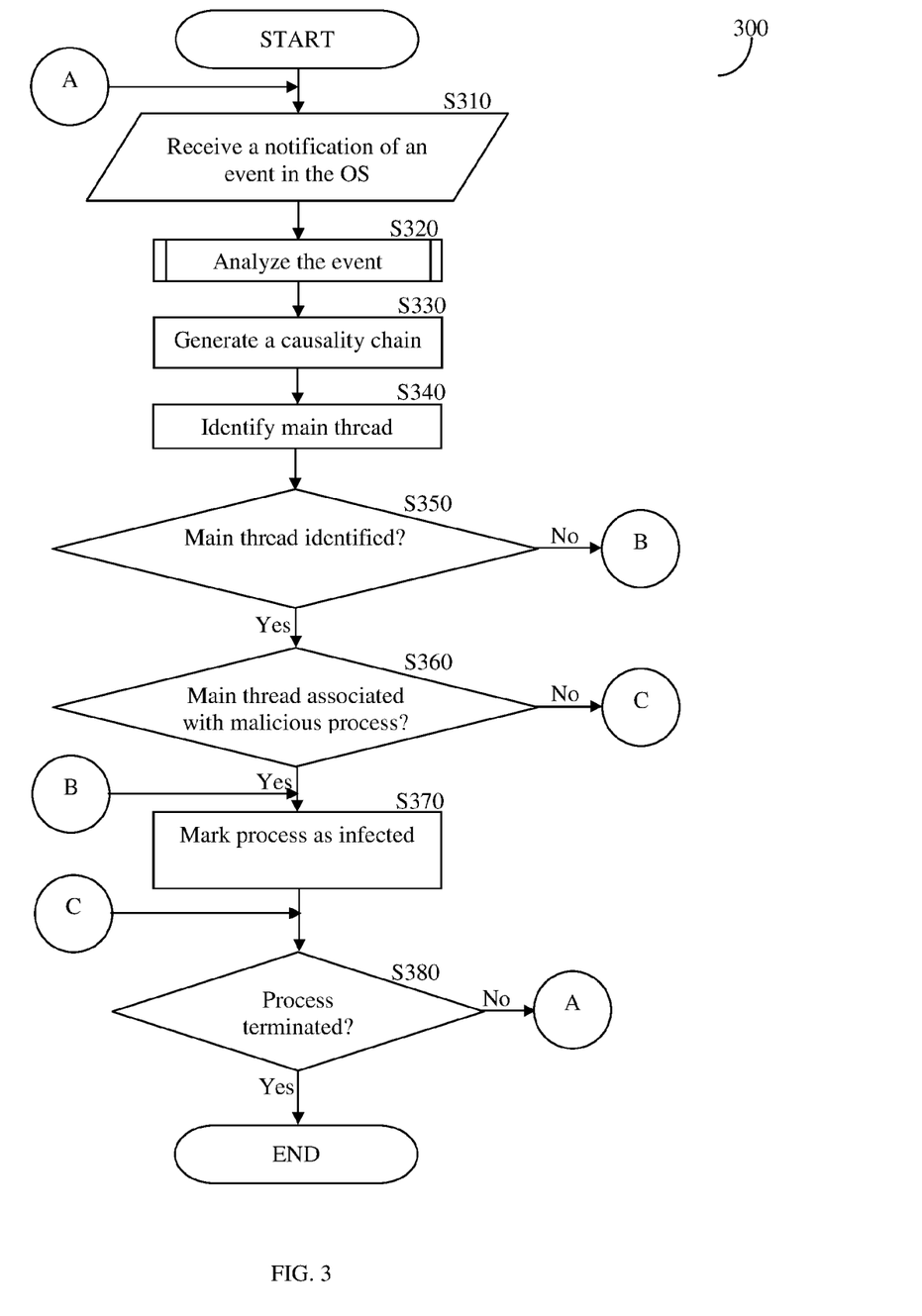
FIG. 3—is a flowchart describing a method for detection of advanced persistent threat in a network according to an exemplary implementation of the disclosed teachings.

FIG. 3 is an exemplary and non-limiting flowchart 300 describing a method for determining types of processes and generating analytics respective thereof according to an exemplary implementation of the disclosed teachings. In S310, the operation starts when at least one event occurred in the network 120 by a user device, for example, the UD 110-1, is identified by the server 130.

In S320, the at least one event is analyzed as further described hereinabove and below with respect of FIG. 4. In S330, respective of the analysis, a causality chain that led to the at least one event is determined. In S340, a main thread that started the process that ended at the at least one event is identified. In S350, it is checked whether the main thread is identified and if so, execution continues with S360; otherwise, execution continues with S370. In S360, it is checked whether a malicious process is associated with the main thread and if so, execution continues with S370; otherwise, execution continues with S380. In S370, the causality chain is marked as infected. In S380, it is checked whether the causality chain terminated and if so, execution terminates; otherwise, execution continues with S310.

Figure 4:
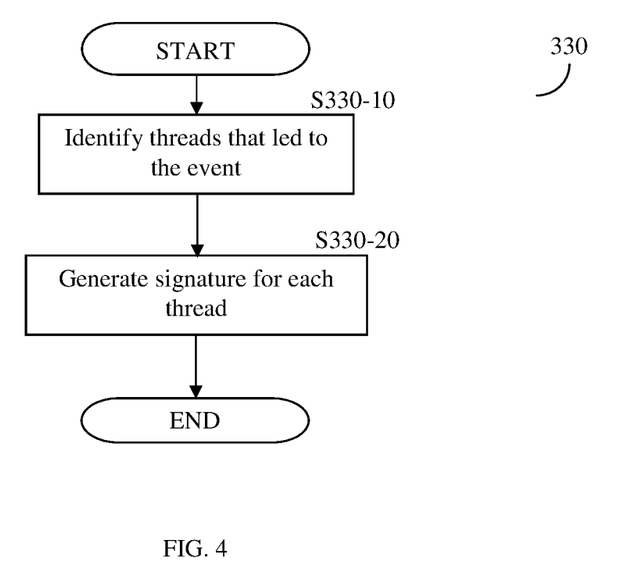
FIG. 4—is a flowchart describing a method for analyzing an event in a network according to an exemplary implementation of the disclosed teachings.

FIG. 4 is an exemplary and non-limiting flowchart 330 describing a method for analyzing at least one event according to an exemplary implementation of the disclosed teachings. In S330-10, threads that led to the at least one event are identified. In S330-20, a signature associated with each thread is generated and execution terminates.

Figure 5:
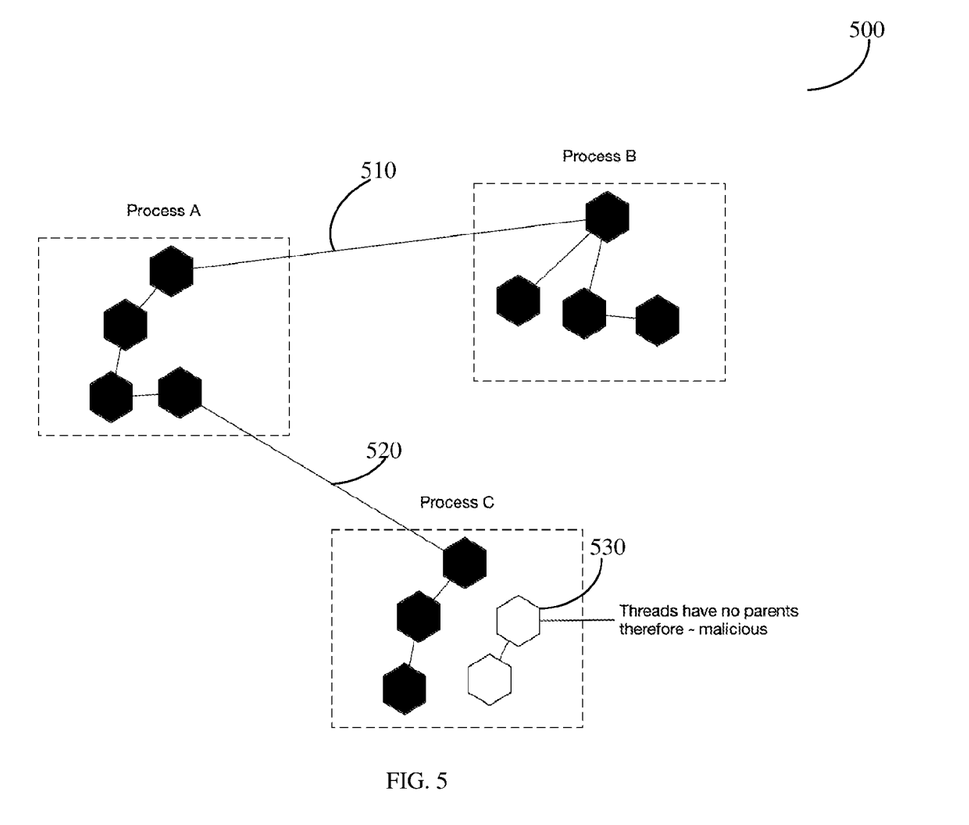
FIG. 5—is a simulation of detection of advanced persistent threat in a network according to an exemplary implementation of the disclosed teachings.

FIG. 5 depicts an exemplary and non-limiting diagram 500 simulating determination whether a malicious process is associated with a main thread of an event according to an exemplary implementation of the disclosed teachings. According to this exemplary implementation of the disclosed teachings, a causality chain of an event comprises three processes, process A, Process B, and Process C. Therefore, as further described hereinabove, all the threads of each process are identified. A thread in process A, initiated 510 the main thread of process B. Another thread in process A initiated 520 the main thread of process C. Process C further comprise threads 530 that have no 'parent thread' and therefore process C is marked by the system 100 as being malicious.

The principles of the disclosed teachings are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosed teachings and the concepts contributed by the inventor to furthering the art and are to be construed as being without limitation to such specifically recited examples and conditions. Moreover, all statements herein reciting principles, aspects, and exemplary implementations of the disclosed teachings, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other exemplary implementations of the disclosed teachings may be achieved without departing from the scope of the disclosed teachings. All such exemplary implementations of the disclosed teachings are included herein. The scope of the disclosed teachings should be limited solely by the claims thereto.

What is claimed is:

1. A method for detecting persistent threats in a computerized environment comprising:
    collecting data related to at least a first event associated with a first process of an operating system of a first device of a plurality of devices connected to a network;
    identifying a plurality of threads which attribute to the first event based, at least in part, on monitoring application program interface (API) calls that spawn the plurality of threads;
    generating a causality chain for the first event, wherein the causality chain comprises the plurality of threads in chronological order of the spawning;
    determining whether a main thread corresponding to the first process can be identified based, at least in part, on the causality chain; and
    based on a determination that the main thread corresponding to the first process cannot be identified, determining that the first process is malicious; and
    marking at least one of the causality chain and the first process as infected.

2. The method of claim 1, further comprising:
    based on a determination that a main thread corresponding to the first process can be identified, determining that a malicious process is associated with the main thread.

3. The method of claim 1, wherein identifying the plurality of threads comprises identifying a signature of each of the plurality of threads that attribute to the first event.

4. The method of claim 1 further comprising, based on determining that the first process is malicious, determining a root source of the first process.

5. The method of claim 4, wherein the root source comprises at least one of a thread and a dynamic link library.

6. The method of claim 1, wherein collecting data about at least the first event associated with the first process comprises receiving a notification of the first event, wherein the notification identifies the first device.

7. The method of claim 1 further comprising monitoring calls to spawn each of the plurality of threads.

8. One or more non-transitory machine-readable media having program code for detecting persistent threats in a computerized environment, the program code comprising program code to:
collect data related to at least a first event associated with a first process of an operating system of a first device of a plurality of devices connected to a network;
identify a plurality of threads which attribute to the first event based, at least in part, on monitoring application program interface (API) calls that spawn the plurality of threads;
generate a causality chain for the first event, wherein the causality chain comprises the plurality of threads in chronological order of the spawning;
determine whether a main thread corresponding to the first process can be identified based, at least in part, on the causality chain; and
based on a determination that the main thread corresponding to the first process cannot be identified, determine that the first process is malicious; and
mark at least one of the causality chain and the first process as infected.

9. The non-transitory machine-readable media of claim 8 further comprising program code to:
based on a determination that a main thread corresponding to the first process can be identified, determine that a malicious process is associated with the main thread.

10. The non-transitory machine-readable media of claim 8 further comprising program code to determine a root source of the first process.

11. The non-transitory machine-readable media of claim 10, wherein the root source comprises at least one of a thread and a dynamic link library.

12. The non-transitory machine-readable media of claim 8, wherein the program code to identify the plurality of threads comprises program code to identify a signature of each of the plurality of threads that attribute to the first event.

13. The non-transitory machine-readable media of claim 8 further comprising program code to monitor calls to spawn each of the plurality of threads.

14. The non-transitory machine-readable media of claim 8, wherein the program code to collect data about at least the first event associated with the first process comprises program code to receive a notification of the first event, wherein the notification identifies the first device.

15. An apparatus comprising:
a hardware processor; and
a machine-readable medium having program code executable by the hardware processor to cause the apparatus to,
collect data related to at least a first event associated with a first process of an operating system of a first device of a plurality of devices connected to a network;
identify a plurality of threads which attribute to the first event based, at least in part, on monitoring application program interface (API) calls that spawn the plurality of threads;
generate a causality chain for the first event, wherein the causality chain comprises the plurality of threads in chronological order of the spawning;
determine whether a main thread corresponding to the first process can be identified based, at least in part, on the causality chain; and
based on a determination that the main thread corresponding to the first process cannot be identified, determine that the first process is malicious; and
mark at least one of the causality chain and the first process as infected.

16. The apparatus of claim 15, further comprising program code executable by the hardware processor to cause the apparatus to:
based on a determination that a main thread corresponding to the first process can be identified, determine that a malicious process is associated with the main thread.

17. The apparatus of claim 15 further comprising program code executable by the hardware processor to cause the apparatus to determine a root source of the first process.

18. The apparatus of claim 17, wherein the root source comprises at least one of a thread and a dynamic link library.

19. The apparatus of claim 15, wherein the program code executable by the hardware processor to cause the apparatus to identify the plurality of threads comprises program code to identify a signature of each of the plurality of threads that attribute to the first event.

20. The apparatus of claim 15, wherein the program code executable by the hardware processor to cause the apparatus to collect data about at least the first event associated with the first process comprises program code to receive a notification of the first event, wherein the notification identifies the first device.

21. The apparatus of claim 15 further comprising program code executable by the hardware processor to cause the apparatus to monitor calls to spawn each of the plurality of threads.

* * * * *

UNITED STATES PATENT AND TRADEMARK OFFICE
CERTIFICATE OF CORRECTION

Page 1 of 1

PATENT NO.         : 10,360,381 B2
APPLICATION NO.    : 15/404545
DATED              : July 23, 2019
INVENTOR(S)        : Gil Barak It is certified that error appears in the above-identified patent and that said Letters Patent is hereby corrected as shown below:

In the Specification

Column 4, Line 15, that portion of the sentence reading:
-all of that threads that led-
Should read:
--all of the threads that led--

Signed and Sealed this
Seventeenth Day of September, 2019

Andrei Iancu
*Director of the United States Patent and Trademark Office*